United States Patent [19]

Fletcher

[11] Patent Number: 4,854,687

[45] Date of Patent: Aug. 8, 1989

[54] BEAM STEERING MIRROR CONSTRUCTION

[75] Inventor: Keith Fletcher, West Palm Beach, Fla.

[73] Assignee: United Technologies Corporation, Hartford, Conn.

[21] Appl. No.: 152,218

[22] Filed: Feb. 4, 1988

[51] Int. Cl.$^4$ .................. G02B 26/08; G02B 5/08
[52] U.S. Cl. ............................. 350/486; 350/636
[58] Field of Search ............... 350/484, 486, 631, 635, 350/636, 637

[56] References Cited

U.S. PATENT DOCUMENTS

| | | | |
|---|---|---|---|
| 3,188,546 | 6/1965 | Dawkins | 318/286 |
| 4,638,221 | 1/1987 | Brignall | 318/48 |
| 4,715,694 | 12/1987 | Eitel | 350/486 |
| 4,750,486 | 6/1988 | Butler et al. | 350/486 |

FOREIGN PATENT DOCUMENTS

| | | | |
|---|---|---|---|
| 2702340 | 7/1978 | Fed. Rep. of Germany | 343/765 |
| 57-138441 | 8/1982 | Japan | 350/636 |

*Primary Examiner*—John K. Corbin
*Assistant Examiner*—Ronald M. Kachmarik
*Attorney, Agent, or Firm*—Edward L. Kochey, Jr.

[57] ABSTRACT

A beam steering mirror is mounted in a frame which is centrally supported by a two axis pivot point. Two torque motors are each connected to the frame with parallel diagonally opposed connecting members. The connecting members, when in the form of cables, are pretensioned an amount greater than the dynamic slewing force.

6 Claims, 3 Drawing Sheets

BEAM STEERING MIRROR CONSTRUCTION

The Government has rights in this invention pursuant to a contract awarded by the Department of the Air Force.

DESCRIPTION

1. Technical Field

The invention relates to beam steering mirrors and in particular to an apparatus for reactionless steering of such mirrors.

2. Background of the Invention

Beam steering mirrors for aiming of laser beams must be rapidly moved for appropriate tracking. The motion should be reactionless to avoid disturbing the other optics in the optical system. Where a plurality of mirrors must be used in parallel, they must in some cases be closely spaced. This imposes a space restraint on the mirror and drive structure.

Prior schemes have used a plurality of linear actuators located behind the mirror. Since all must be coordinated and must respond together in moving the mirror the control system is complicated. These also suffer from an extremely limited angular range of mirror rotation.

It is also known to use a torquer containing counterrotating masses to rotate a trunion. This trunion in turn supports other torquers which rotate not only the mass of the mirror, but also that of the trunion and the other torquer. The requirement of a trunion ring and a torquer outside the mirror perimeter takes substantial radial space. Further, the torquer mounted within the trunion ring is physically close to the mirror and exposes the mirror to thermal loading and possible distortion.

SUMMARY OF THE INVENTION

A steering mirror is centrally supported on a two axis gimbal. Only sufficient frame structure is attached to the mirror to transfer loads to the mirror with minimum distortion. Two torquers each having counterrotating masses are set at 90 degrees with respect to each other. These torquers are connected by struts in the form of connecting rods or cables to the mirror frame.

The struts are parallel to each other avoiding differential vertical movement. The connecting arms are circumferentially arranged with respect to the mirror to provide an overall compact arrangement.

DESCRIPTION OF THE PREFERRED EMBODIMENT

Figure 1:
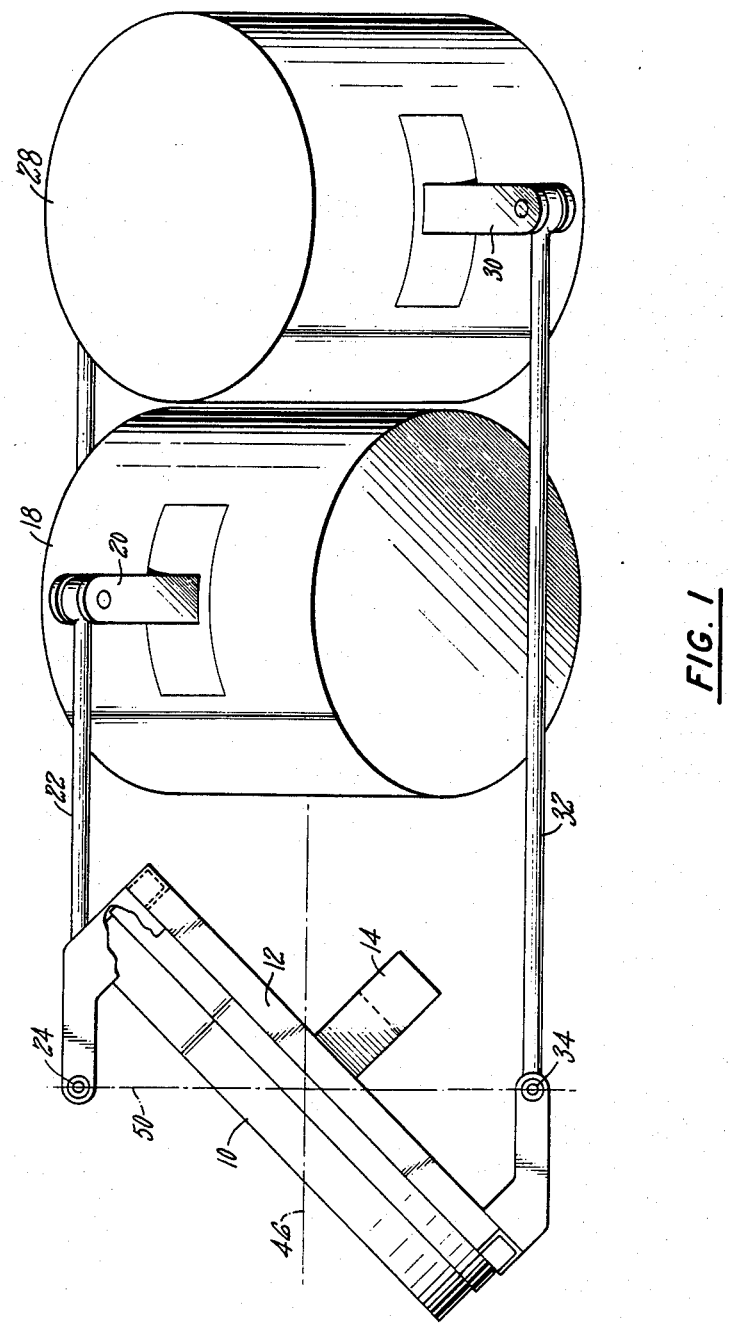
FIG. 1 is a general top view of the apparatus.
Figure 2:
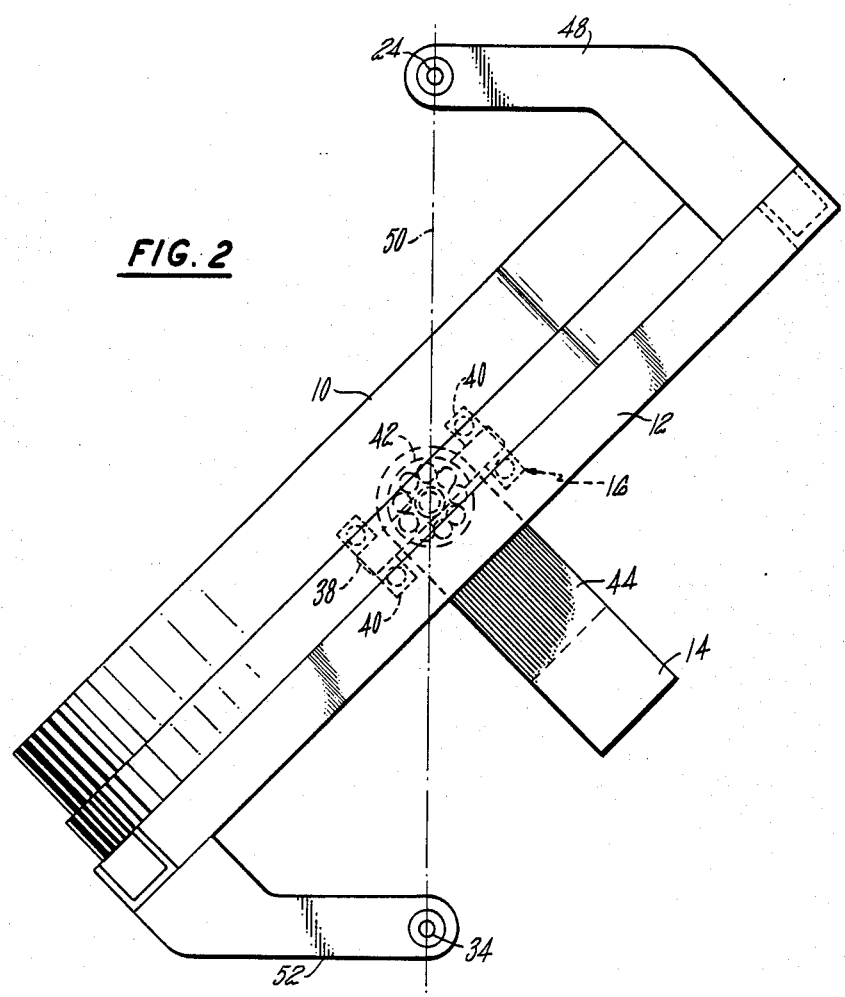
FIG. 2 is a closer detail of the mirror connection.
Figure 3:
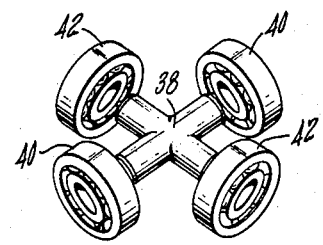
FIG. 3 is an exploded view of the mirror support bearing.

A beam steering mirror 10 is supported in the lightweight mirror support frame 12, this frame being only of sufficient mass to transfer slewing loads to the mirror with low distortion. A support structure 14 carries a two axis gimbal support 16 which in turn supports the mirror support frame. The center pivot point of this two axis gimbal must coincide with the center of gravity of the mirror and frame for reactionless operation. It can be seen that the mirror is free to rotate in both the X and Y direction around this center support.

A first torquer 18 is located behind the mirror, this torquer including counterrotating masses with the drive portion connected to arms 20. These arms 20 are in turn connected through connecting member 22 in the form of connecting rods to a two axis pivot 24. When movement of the mirror 10 is required, the torquer is electrically activated with arm 20 driving through connecting member 22 to rotate the mirror. The conterrotating mass within the torquer assembly rotates in an opposite direction with the forces thereby being counterbalanced. The connecting members 22 are located 180 degrees on opposite sides of the mirror.

A second torquer 28 is disposed 90 degrees from the first torquer and includes a pair of arms 30. These are connected by connecting members 32 to another pair of two axis pivots 34 located intermediate then 90 degrees from the first pair of two axis pivots. Each of the two axis pivots not only tolerates the reaction of the mirror caused by the connecting member, but also allows rotation in the other direction when the alternate pair of connecting rods are rotating the mirror.

Connecting members 22 and 32 are secured between the arms of the torquer and the two axis pivot with no looseness between the two components. Accordingly, the two axis pivot 24 and the bearing joining the connecting member to the torquer arms are each of the precompressed type allowing no radial movement of the bearings. The preload in the bearings should be greater than the largest dynamic load encountered.

The two axis gimbal 16 includes an internal two axis pivot 38 to which are mounted four high grade ball bearings. The outer race of bearings 40 is secured to the mirror frame while the outer race of bearings 42 is secured to a cantilevered support portion 44 of the support structure 14.

In the normal condition the mirror would be supported at approximately 45 degrees from the axis 46 through the mirror and torque motors. This is the nominal position with controlled movement expected plus or minus 10 degrees from this position around both the X and Y axes. While this particular illustration uses an angle of 45 degrees, it is understood that this angle may vary depending on the specification for the apparatus.

Two forward extending mirror frame arms 48 hold the two axis pivots 24 in a plane 50 which is perpendicular to axis 46. In a similar manner two rearwardly extending mirror frame arms 52 hold the other two axis pivots 34 in this same plane. In the nominal condition the two arms 20 of the first torquer and the two arms 30 of the second torquer also lie in planes perpendicular to the axis 46. Accordingly, since the two axis pivots on the frame arms rotate around the same radius as the arms of the torquers. During movement of the mirror therefore the connecting rods 22 and 32 remain parallel to the axis, are of the same length, and there is no differential vertical movement between the ends of the rod, with opposed connecting rods moving vertically an equal distance. Opposed connecting rods being of the same length and therefore the same mass produce the same eccentric differential forces as they are translated parallel to the axis 46. All connections to the mirror frame must lie in plane 50 to prevent "bind up" of the drive system during large angle movement.

Figure 4:
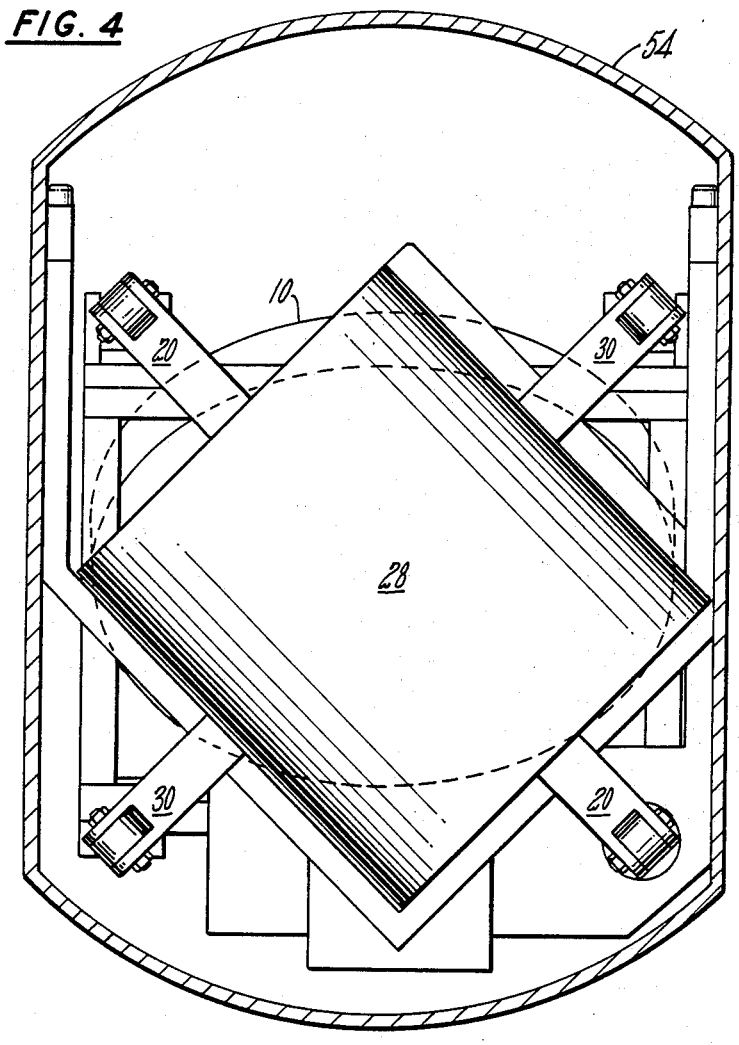
FIG. 4 is an end view of the apparatus.

An end view illustrated in FIG. 4 shows the general orientation of torquer 28 with torquer 18 being hidden behind it and the location of the torquer drive arms 20 and 30. It can be seen that these are located at an angle to conveniently fit within canister 54 thereby providing a very compact radial arrangement.

Figure 5:
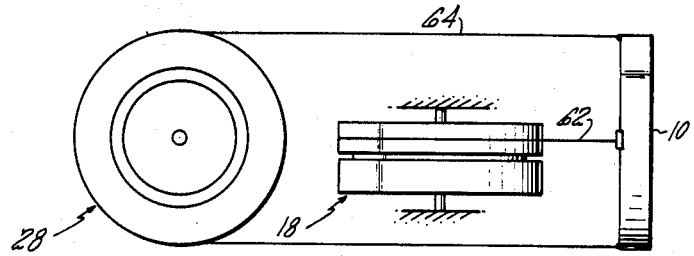
FIG. 5 is an alternate arrangement using cables.

FIG. 5 schematically illustrates an alternate arrangement wherein torquer 18 is secured to mirror 10 by connecting members in the form of flexible cables 62. Torquer 28 is secured to the mirror with connecting members in the form of flexible cables 64. These cables may be attached to the mirror in any manner which does not distort the mirror, but they must be pretensioned with the force greater than the expected slewing forces so that the cable stretch does not result in looseness during the slewing operation. Since the cables themselves are flexible they fulfill the purpose of the two axes at the point of connection of the cables to the mirror or frame. The mirror is still centrally supported on a two axis gimbal as earlier described.

I claim:

1. A reactionless beam steering mirror apparatus comprising:
   a support structure;
   a beam steering mirror;
   a mirror support frame supporting said mirror;
   a two axis gimbal support centrally supporting said mirror, having a two axis pivot point located at the center of gravity of said mirror and frame, and secured to said frame and said mirror support;
   a first torque motor having counterrotating masses;
   a first pair of connecting members pivotally connected to said first torque motor and gimballed on two axes to said mirror support frame at two diagonally opposed first locations;
   a second torque motor having counterrotating masses;
   a second pair of connecting members pivotally connected to said second torque motor and gimballed on a two axis gimbal to said mirror support frame at two diagonally opposed second locations intermediate said first locations.

2. An apparatus as in claim 1:
   each pair of connecting members being parallel to each other.

3. An apparatus as in claim 2:
   said first pair of connecting members being 90 degrees from said second pair of connecting members.

4. An apparatus as in claim 1:
   each connecting member in tension an amount greater than the designed slewing forces.

5. An apparatus as in claim 1:
   said mirror being in a plane a nominal angle from the axis through said mirror and torque motors;
   said mirror support frame including two frame arms extending rearwardly to a location in a plane perpendicular to said axis passing through the pivot point of said mirror and two frame arms extending forwardly to a location in said plane perpendicular to said axis passing through the pivot point of said mirror;
   said connecting members all connected to said arms at said locations.

6. An apparatus as in claim 1:
   said torque motors each including a pair of outwardly extending torque arms; and
   each connecting member connected to said torque arms the same distance from said axis as the connection of said connecting members to said frame arms from said axis.

* * * * *